US012512082B2

(12) United States Patent
Friedman

(10) Patent No.: US 12,512,082 B2
(45) Date of Patent: Dec. 30, 2025

(54) NECK AND FRETBOARD MODIFICATION AND METHOD OF TUNING TO FACILITATE PLAY

(71) Applicant: Moshe Y. Friedman, South Fallsburg, NY (US)

(72) Inventor: Moshe Y. Friedman, South Fallsburg, NY (US)

( * ) Notice: Subject to any disclaimer, the term of this patent is extended or adjusted under 35 U.S.C. 154(b) by 334 days.

(21) Appl. No.: 18/210,757

(22) Filed: Jun. 16, 2023

(65) Prior Publication Data

US 2023/0410770 A1 Dec. 21, 2023

Related U.S. Application Data

(60) Provisional application No. 63/352,750, filed on Jun. 16, 2022.

(51) Int. Cl.

*G10D 3/06* (2020.01)
*G10D 1/08* (2006.01)

(52) U.S. Cl.

CPC ............... *G10D 3/06* (2013.01); *G10D 1/085* (2013.01)

(58) Field of Classification Search

None
See application file for complete search history.

(56) References Cited

U.S. PATENT DOCUMENTS

2004/0173080 A1* 9/2004 Pye .......................... G10D 1/08 84/314 R
2020/0013309 A1* 1/2020 Zintel .................... G10D 3/053

* cited by examiner

*Primary Examiner* — Kimberly R Lockett

(57) ABSTRACT

Modifications to the neck and fretboard of stringed instruments to enable methods of play involving same-note tuning of a plurality of strings for increased ease of learning and to facilitate play.

20 Claims, 19 Drawing Sheets

NECK AND FRETBOARD MODIFICATION AND METHOD OF TUNING TO FACILITATE PLAY

PRIORITY CLAIM

This non-provisional application claims the benefit of and priority to U.S. provisional application 63/352,750, filed Jun. 16, 2022. The referenced application is included here in its entirety as if restated in full.

BACKGROUND

The standard methods of playing guitar and similar stringed instruments require a great deal of skill, particularly hand and finger dexterity. A typical guitar has six strings, commonly tuned successively from lower to higher notes E A D G B E. Intricate finger patterns must be learned and memorized, and the player must accurately move and place each finger of the fretting hand for the desired note or notes to be played while the other hand simultaneously plucks or strums or taps the corresponding strings. Over time the player's fretting hand fingertips develop calluses, which may assist in playing, and the finger patterns and plucking or strumming techniques may become automatic. However, anyone with limited dexterity, small hands and/or shorter fingers will have difficulty playing, let alone ever acquiring the necessary skills and techniques. In addition, players with adequate dexterity and average finger and hand shape sizing must still expend considerable effort before their playing could be considered enjoyable or even listenable. True mastery of the instrument requires many years of practice. Because of the complexity and effort involved, many who otherwise would enjoy playing are unable to do so.

The present method and modifications overcome the typical difficulties and enables anyone to more quickly and easily play songs and melodies on such instruments.

SUMMARY

First, the alternative tuning conceived here primarily involves tuning the all strings to the same note (i.e., tuning all strings to any single note from A to G♯.) but other options include using various other open string chord tunings. Since strings have different thicknesses and because a string must be reasonably taut to provide the tension necessary for proper playing, the strings will not necessarily be tuned to the same octave for that note. It is expected that the strings will be tuned to multiple octaves of that note. There is a harmonic relationship between notes of different octaves, and so if multiple strings are played at once, a multiplicity of octaves will be sounded, thereby providing improved harmonic resonance over playing merely one string pegged to the note of a single octave.

Thus, for example, if all of the strings are tuned to note "C", when strummed together the result is a mixture of C notes across a plurality of octaves, and the resulting sound is richer, fuller, and more nuanced than if all the strings were tuned to C at the same octave. As a more specified but non-limiting example: the two highest strings may be tuned to a higher octave note C, the middle two or three strings may be tuned to a middle octave note C, and the lowest one or two strings may be tuned to a lower octave note C. In this way, if just the higher strings are plucked or strummed, just the higher sounds will be produced, and if just the lower strings are plucked or strummed, just the lower sounds will be produced. It is also possible to tune all strings to the same octave if one so wishes.

According to convention, the open strings are designated as "fret zero". If fret zero is tuned to "C", then playing while pressing down on the first frets for each string produces a harmony of C♯ (or D flat) notes, playing while pressing down on the second fret produces a harmony of D notes, and so on, with each successive fret providing successively higher notes. In this way, any desired note, with harmonic support provided by playing a multiplicity of strings, may be changed to another note simply by moving one's finger or fingers from fret to fret.

Since the harmonic resonance of a single note is enabled without having to play distinct notes positioned on different frets, the need for finger patterns to engage different frets is obviated. Music can now be played by pressing down on the strings—not with fingertips, as is typical, but with the flat length of a finger against some or all of the strings. This is known as "barring" the strings. Barring is advantageous because it eliminates the need to develop calluses on the fingertips, and it is considerably easier to press the strings and sustain the concomitant notes. Barring may be accomplished with any of the fingers of the fretting hand—e.g., the index finger, middle finger, ring finger, pinky, or for some playing styles, even the thumb. For certain playing styles not all of the strings have to be played while barred, and alternatively a single string or strings may be pressed or barred to produce a drone-like sound.

In one embodiment, to improve the play of the alternative tuning, the stings may be sized so that all of the strings will possess roughly equal string tension while providing different octaves of the same note accessible via the same fret. Generally, the tension in conventional guitar strings is 60-80 Newtons. It is preferable to maintain uniformity of tension in order to provide a consistent tone between strings. In order to fix the note played at fret zero while keeping the string tension uniform, either the length or the diameter of the string must be adjusted. In one variation, the length and tension remain substantially uniform across the strings while the diameter changes. Specifically, the string diameter decreases sufficiently from the string tuned to the lowest octave of a given note, to the subsequent string tuned to the second lowest octave of the note, and so on until the last string, which has the highest octave of the note but the lowest diameter. Typical and applicable strings may include gut, steel, steel with nickel plating, steel with brass plating, steel with bronze plating, nickel, or nylon. The strings may be wound in any appropriate fashion.

Unconventional, more specifically devised strings may be implemented to obtain the parameters just described. It is also possible to obtain the uniformity of tension without requiring newly devised strings, but the guitar (or similarly fret-based stringed instrument) will have to be modified, via another variation, as follows. The diameter and tension remain substantially uniform across the strings while the length changes. While the active portion of the strings—i.e., the portion on which play occurs via fretting and plucking or strumming—begins at the same relative position vis-à-vis the headstock, the strings may be pegged or otherwise clamped at different points along the main body of the guitar. The bridge or saddle may be arranged more diagonally to accommodate the greater disparity between the positioning of the longest string from the shortest string. Specifically, the string tuned to the lowest octave of a given note is longer and is clamped closest to the edge of the main body opposing the headstock, and the subsequent string with the second lowest octave of the note is less long and clamped further from the edge, and so on until the last string, which has the highest octave of the note but the shortest length. In yet another variation, both the length and diameter change to enable the designated tuning while the tension remains substantially the same. In yet another variation, the length and/or the diameter of strings are changed while preserving a degree of tension.

In one embodiment, a bridge attachment is utilized to adjust the length of the strings. This bridge attachment may attach itself either to the bridge or the body in order to shorten the active string length, particularly of the lower strings so as to increase their relative pitch. Active string length signified not the total length of the string, but the portion of the string that vibrates when struck and is generally disposed between the nut and the bridge. In one version, the bridge attachment may press the strings against the body before they approach the bridge. In another version, at least a portion of the bridge attachment is disposed between the strings and the body and pushes upward toward the string away from the body so that the strings retain, more or less, their angle vis-à-vis the body while simultaneously terminating the primary vibration region of the string.

Additional modifications to an existing fret-based stringed instrument as conceived here involve specifically marking or coding the fretboard to transform it to resemble the white and black key pattern typical of piano keyboards. The visual effect of seeing the keyboard pattern on the guitar neck facilitates play by obviating the need to remember which fret corresponds to which note. The visual appearance of the indicators may also add to the enjoyment of the audience or provide them an added educational benefit. Additionally, people who are already familiar with the layout of a keyboard will find it easier to play the guitar when the visual appearance of the frets substantially match the visual appearance of the keyboard.

In one variation, labels or stickers are affixed at the bottom of the head at fret zero, and all along the guitar neck appropriately marking the note of each fret. The labels may be affixed above each fret along the top side of the neck facing the player so that only the player can see them, or they may be placed on the surface of the fret spaces themselves such that they are clearly visible to the audience from the front of the guitar, or they may be affixed in both areas. In one variation, labelling of any sort for fret zero is omitted, and the designation is implied by the labelling at the first fret. In one variation, the indicators cover only a portion of the fret space—e.g., ¼ of the fret space, ⅓ of the fret space, ½ of the fret space, etc.

Placing stickers or labels for note identification or decoration on such instrument has been done before, however never has it been done in the manner explained here. The labels may be substantially white or off-white to correspond to the natural notes and relatively dark or black for the frets corresponding to the sharp and flat notes. The result will be that the guitar neck will resemble the familiar white and black piano keyboard pattern. Typically, fretboards are black or a dark color, and therefore no stickers may be needed for the frets associated with the sharp or flat notes—however, if desired appropriate dark colored stickers can be affixed, or the colors may be reversed black for natural notes and white for sharps and flats, or any colors or patterns may be used as desired for any notes. Aside from white and black any sufficiently distinct colors or designs may also be used.

If desired especially for beginners the stickers may be marked with the names of the corresponding notes that would be produced when playing with a finger on the associated frets. Natural notes, sharps, and flats may be marked in any orientation for preferred viewing by the player and/or the audience. The note names may be in any font style, size, or language. All notes, including sharps and flats could be marked, or merely the natural notes, as desired.

The proper note sequence designations for the labels will depend upon the note chosen to be the open string note for the particular tuning that is used. This may be set to any note desired from notes A and A♯ to G and G♯. When the guitar open strings are tuned to another note then a new set of labels is provided with the proper corresponding white and black pattern and note designations.

The stickers or labels may be of plain paper, laminated or coated to make them cleanable and longer lasting or glow in the dark, or of relatively hard and durable plastic, metal, or other material or any combination. The stickers may be removably attachable to the frets with adhesive, clamps, tension clips, magnets, or in other ways.

Kits consisting of sets of stickers and/or labels may be provided ready to be applied to an instrument's head, neck and/or fretboard, for any and all of the possible open note tunings typical of western or alternative music, and designed to fit perfectly for installation on standard and custom instruments, with necks and fretboards of differing dimensions. Kits may provide sets of preprinted labels which can be changed as needed. Once the note is chosen to which the open strings are to be tuned, the correct corresponding white-black note sticker sequence and designations can be applied, and then the instrument will be ready to be played using the instant method.

It is also possible to make these stickers or labels such that they are all connected and joined together in only a few sections or in a single unit to be applied as a single piece to the instrument. In one variation, the stickers or labels are connected over a lateral portion, with the lateral portion configured to be placed on a side, usually the top side, of the neck of the instrument adjacent to the fretboard. In this variation, the stickers or labels protrude from the lateral portion in order to cover a portion of the fretboard, separate after protruding from the lateral portion so as not to cover the conventionally metal fret bars.

In another variation, instead of stickers or labels, electronic means are used to identify the frets and their correspondence to the notes of a keyboard. For example, thin LED lights or panels can be affixed to the frets and/or neck programmed to light up in a pattern corresponding with any note that is chosen for the open string note. Light patterns could be changed with the mere pressing or tuning of a knob or button to select any open string note tuning desired and to indicate the proper associated sequence of natural and half notes to display along the entire length of the neck or fretboard. An electrical control box attached or mounted to the body, neck, head or any appropriate part of the instrument may provide switches, knobs, up/down buttons or the like for selecting the note for the open strings and to properly display the corresponding arrangement of white and black key pattern and note designations for the frets.

In another variation, instruments are designed right from the start for using this method with the keyboard pattern already embedded into the base of the head, neck and fretboard. Instruments could also be made with built in LED lights or panels and with controls to cause to light up any pattern of white and black frets desired and/or to indicate the corresponding note names. In another variation, a single LED screen can be disposed across the fretboard and/or neck and configured to display any desired pattern, message, or logo, in a static or rolling format.

This method may also use strings with different gauges than standard strings, for example by using more than one lowest note gauge strings or more than one highest note gauge string and using different gauges for the middle strings. In order to give versatility in a single performance, double or multiple necked instruments may provide one neck for standard tuning and one neck for all same note tuning, or different necks for same note tuning based on different open string notes. The method is suitable for instruments with any number of strings—e.g., 4 strings, 6 strings, 12 strings, etc.

In another variation the neck of the instrument comprises a recess or set of recesses, with the recess(es) disposed underneath the fretboard but visible on and accessible via the upper portion of the long side of the neck such that they are visible to a player of the instrument during standard play. These recesses may be configured to receive three dimensional marks or indicators to indicate the note to which each fret corresponds. These marks or indicators may be embedded temporarily into the recesses in order to permit the strings to be retuned with a different note at fret zero. The marks or indicators may be slidably inserted or otherwise entered into the recesses. A plug or tab may extend from the marks or indicators permitting their easy removal. The marks or indicators may remain in place via a snug-fit type configuration, such that the cavity between the walls of a recess are approximately or slightly larger than the dimensions of the marks or indicators.

Alternatively or additionally the marks or indicators may comprise a first set of magnets configured to engage with a second set of magnets, with the first set of magnets embedded in the marks or indicators and the second set of magnets embedded at the nadir of the recess(es). As a variation, the configuration could feature one set of magnets and one set of components made of magnetically receptive materials. The positioning of the marks or indicators may be adjacent to the corresponding fret, or adjacent to the space subsequent to the fret, in order to indicate the place where the finger(s) should be positioned to provision the desired note.

In one version of this variation the fretboard surface is transparent, made of glass or a transparent thermoplastic such as acrylic. The recesses may extend across the majority of the fretboard width such that the marks or indicators may be seen through the transparent face of the fretboard. Ideally, the marks or indicators are shaped to be substantially the same shape and size of the space between each fret.

In another version of this variation the fretboard features a removable transparent face. The transparent face may be removed, thereby revealing recesses within the fretboard and into which the marks or indicators may be placed. The transparent face may then be reattached to the fretboard in order to keep the marks or indicators in their positions as well as to provide the appropriate surface for the player to press the strings against. The surface may be configured to have the same texture as a traditional wooden fretboard or may be molded and contoured to receive a finger in its lengthwise barred positioning. The metal frets may be embedded or removably embedded into the transparent face, or the transparent face may be shaped to feature protrusions made of the same material as the transparent face but serving the same purpose of conventional metal frets. The transparent face may also feature cut-outs in order to snugly fit over the frets, with the frets protruding through the cut-outs.

In one embodiment, the indicators may similarly be integrated with a fretless instrument. In this case, the indicators operate via any of the embodiments or variations described above—with the metal frets omitted. The indicators may have a "generalized portion" and a "focused portion", with the generalized portion having the same size and shape as the indicators described above, but with the focused portion indicating, more specifically, the place where a given note is purest—i.e., where the metal fret would have been if the instrument were fretted.

Midi or digital instruments may also use the alternative tuning method described herein. The digital instrument may feature a digital fretboard, which may be embedded with pressure sensors or buttons configured to detect the occurrence and magnitude of finger engagement by the player. The digital instrument may be programmed to correspond to the desired tuning, with the neck and/or frets programmed to indicate the white and black keys and the corresponding notes. Such versions would be able to instantaneously transpose the tuning and layout of the displayed keyboard since LED lights could be turned on and off to make the frets appear as white and black keys and display the corresponding note names as desired. The sound could also electronically be manipulated and enhanced in many ways to emulate the sound of other instruments that may be selected.

In one embodiment, the digital instrument features an input device for receiving commands from the player. These commands may include the selection of the note to which the open strings are set and the indicators to be used to indicate the note for each fret. The input device may be a touch screen display or a controller connected to a processor. The connection between the instrument and the processor may be via direct incorporation into the head, neck, or body, or over a wireless protocol such as WiFi.

In some embodiments, the digital instrument may omit the strings—instead, players press their fingers against the digital fretboard surface directly, and the desired note is triggered via sensors, including pressure or impact sensors. The instrument could be manufactured to enable the automatic strumming or plucking based on the frets engaged, or the instrument could be manufactured such that manual strumming or plucking of a set of strings ranged and limited on a portion of the instrument generally designated for the pick-ups. Such strings would not extend across the fretboard but would operate as sensors of their own, and communicate the occurrence of strumming or plucking to the instrument processor. Other musical effects could be affected instantly by the mere pressing of buttons or turning of knobs. The input device may also allow the player to select a melody and the processor will initiate a sequence of fret note keys to automatically light up, thereby assisting the player in learning where to place his or her finger or fingers.

In one version of the digital instrument, the spacing of the fret widths are tapered, like the standard guitar fret spacing, with the lower sounding frets nearer to the head being wider and the frets for the higher notes nearer the body being narrower. In another version, the fret widths may possess uniform spacing as in a regular piano keyboard, such that all of the white and black frets are of similar width. In another variation, the black sharp/flat key frets are indented and interspaced in between the white keys so as to more closely resemble a standard keyboard configuration.

Toy instruments may be made or adapted in accordance with the methods or modifications described above.

DESCRIPTION OF THE DRAWINGS

Figure 1:
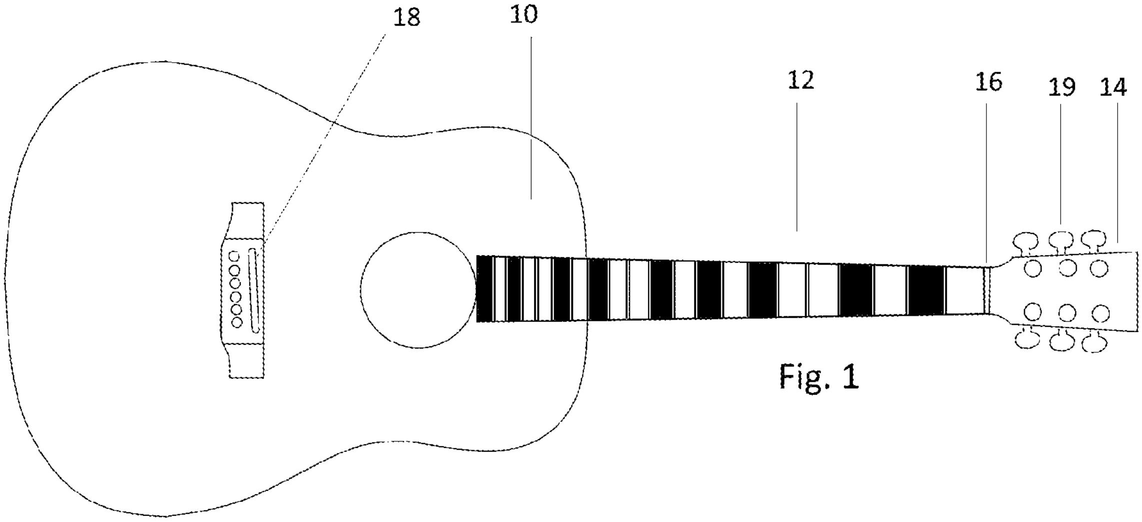
FIGS. 1-12 show exemplary fretboard indicators for an acoustic guitar with each string tuned to the same note.
Figure 2:
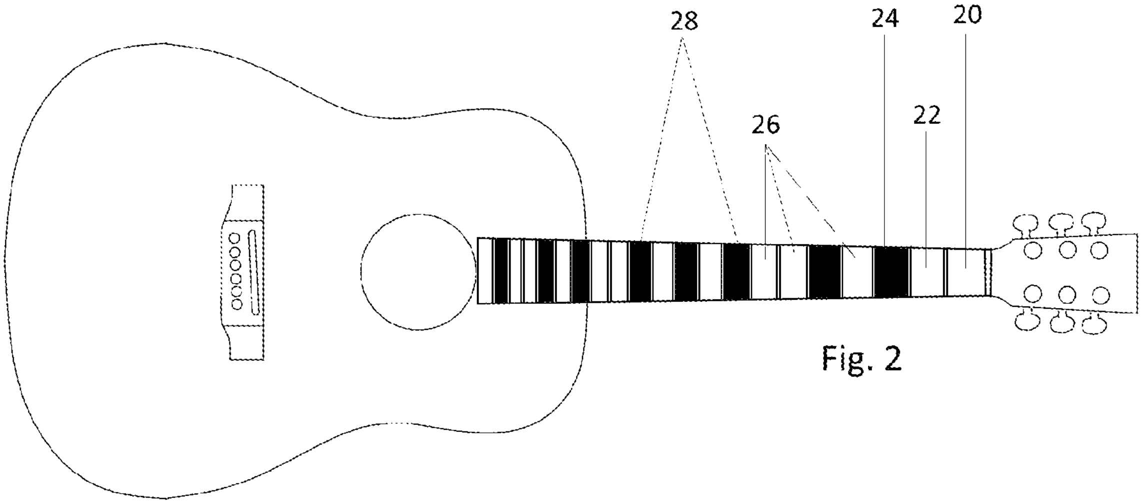
Figure 3:
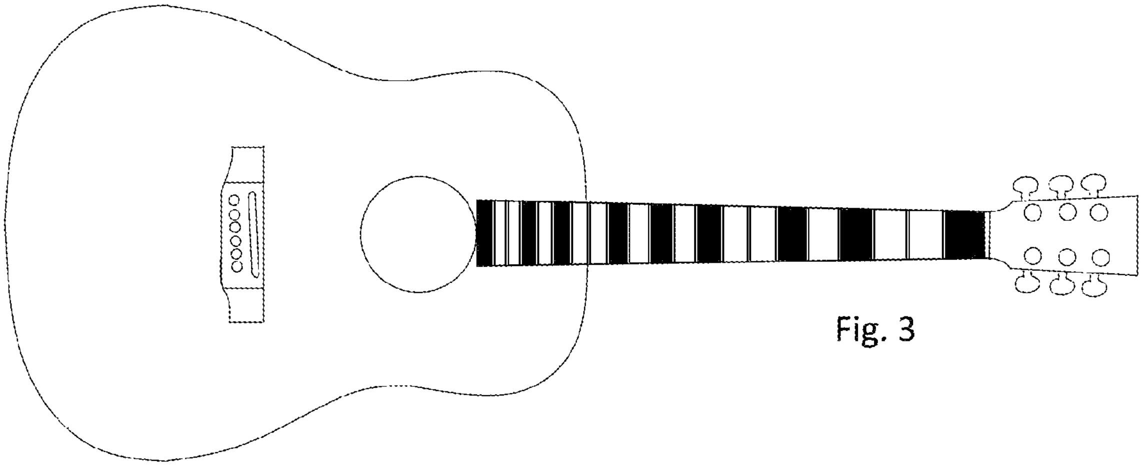
Figure 4:
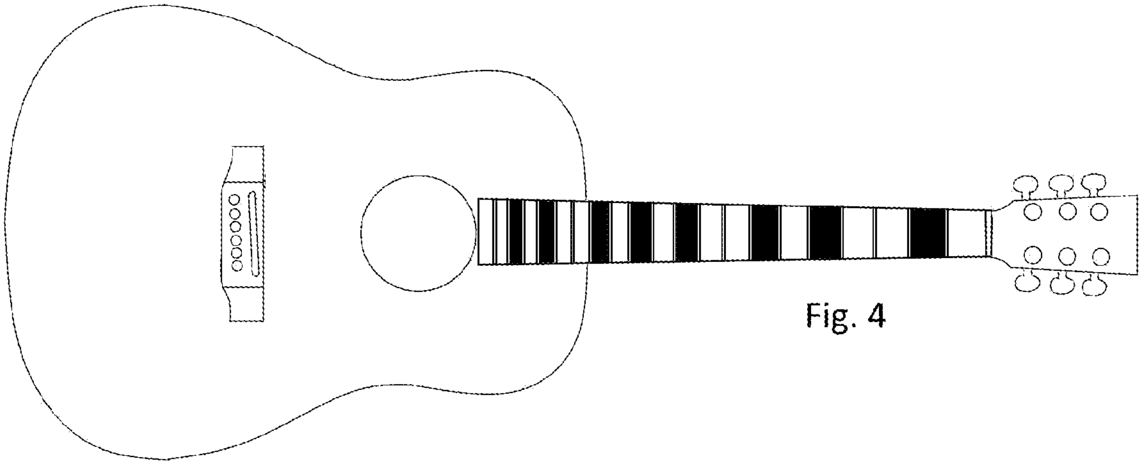
Figure 5:
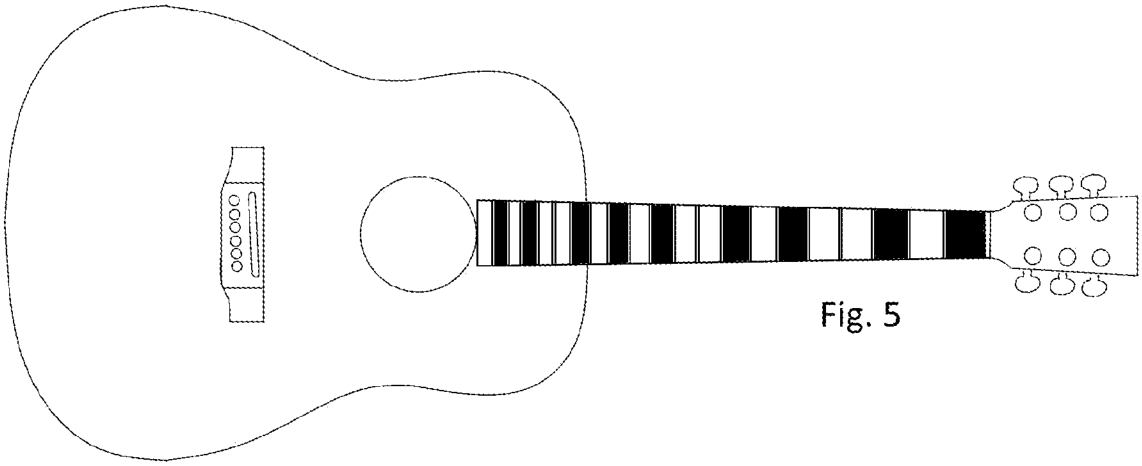
Figure 6:
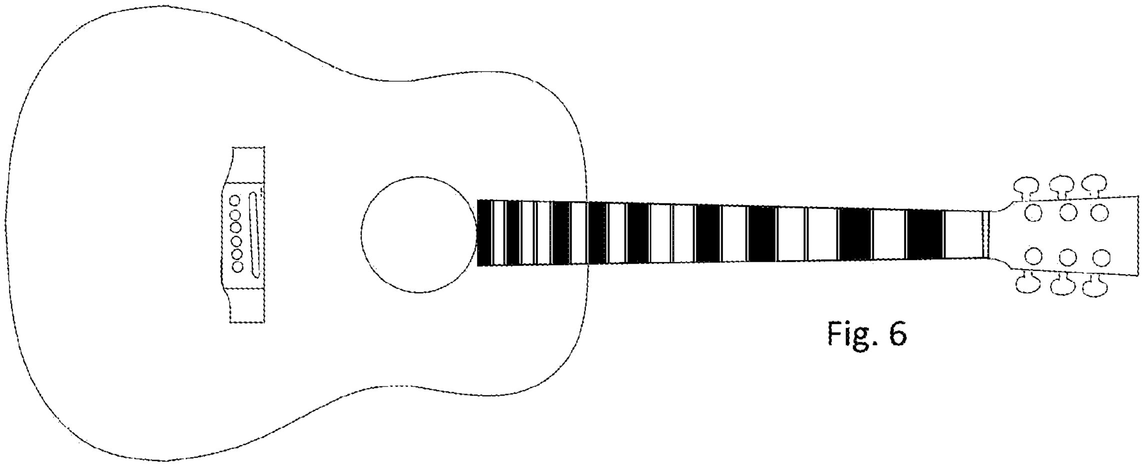
Figure 7:
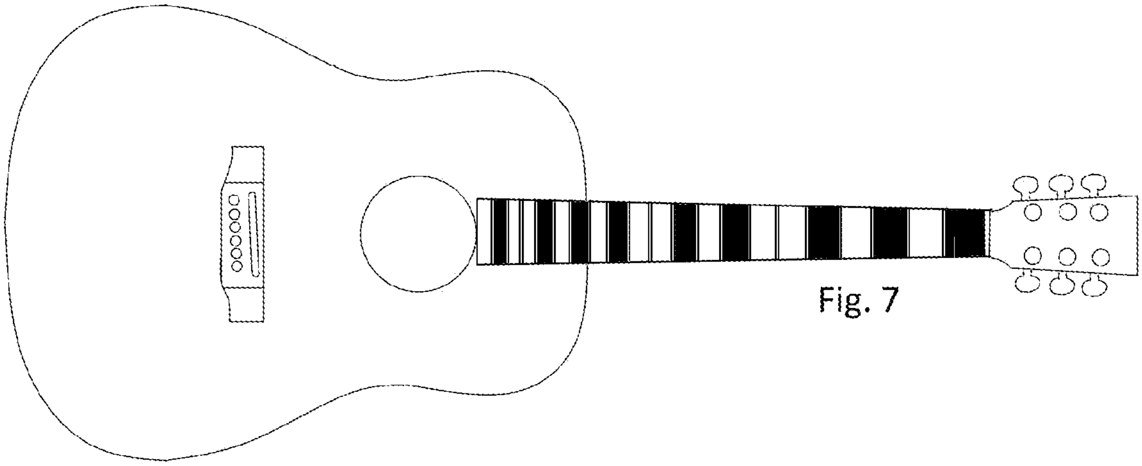
Figure 8:
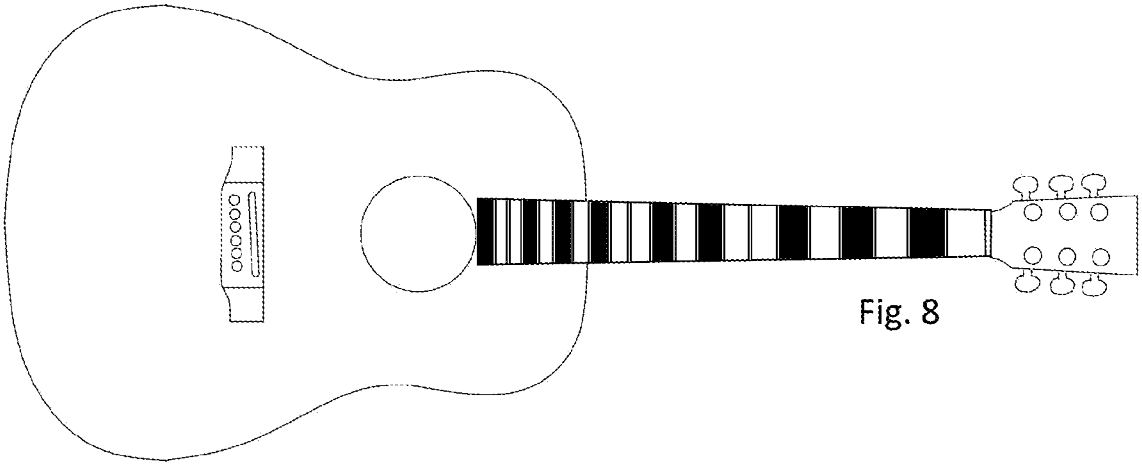
Figure 9:
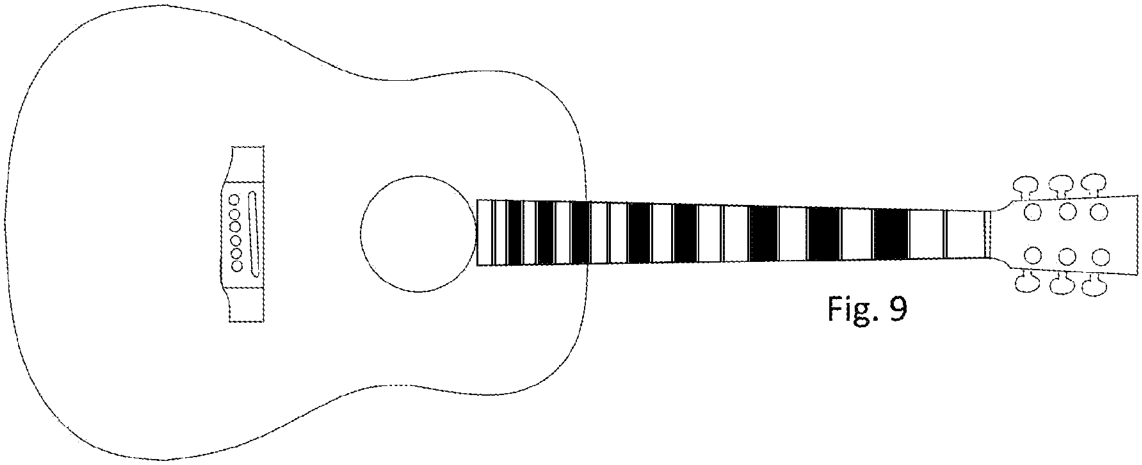
Figure 10:
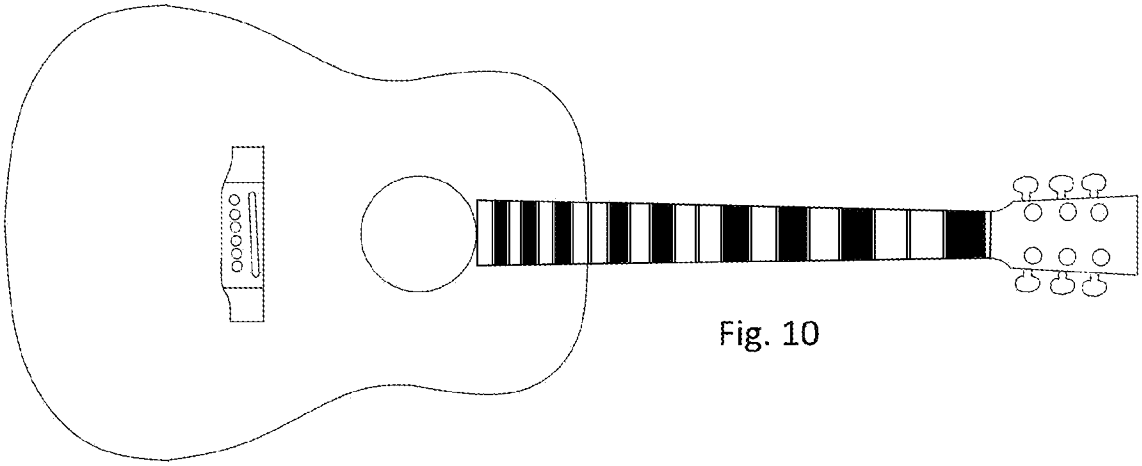
Figure 11:
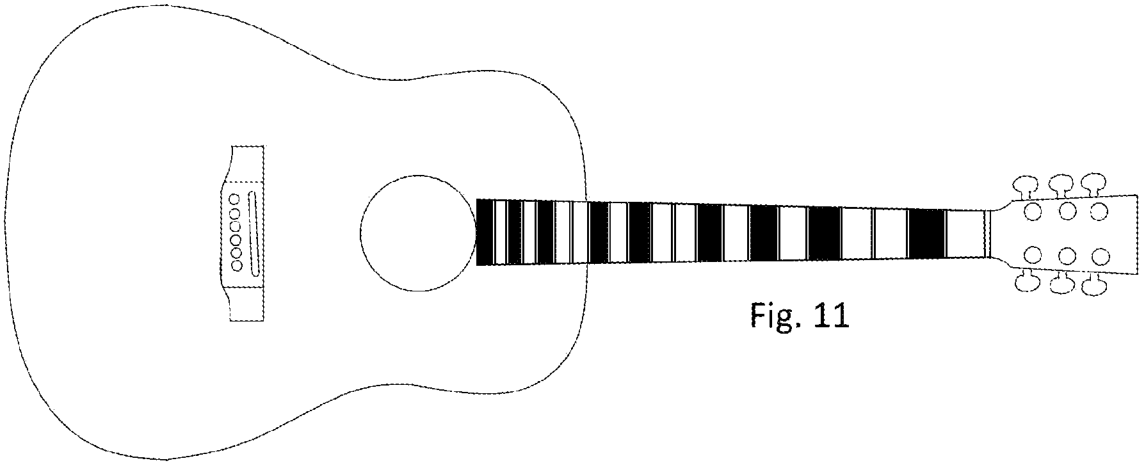
Figure 12:
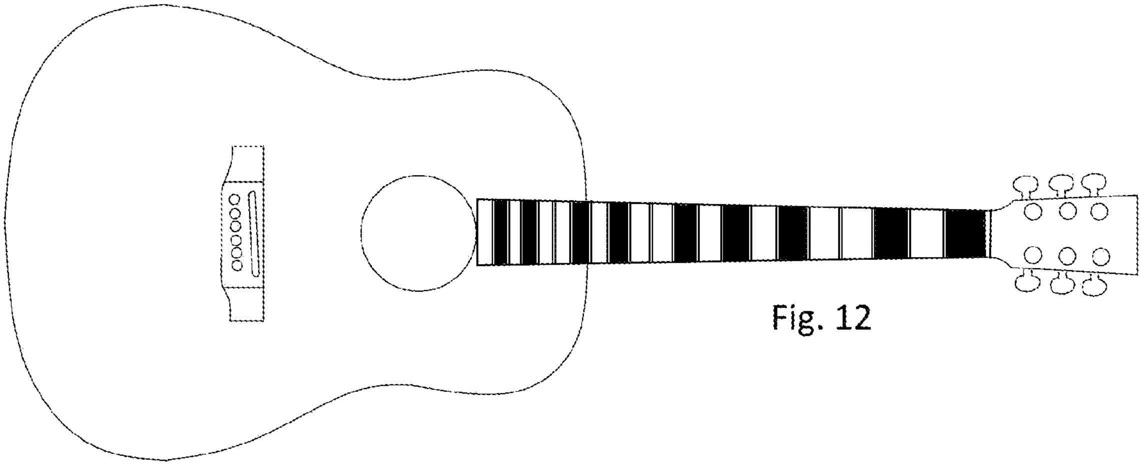
Figure 13:
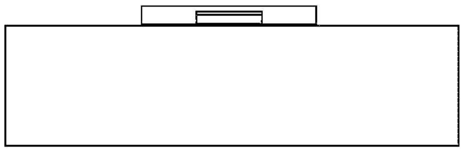
FIG. 13 shows a bottom view of an exemplary acoustic guitar.
Figure 14:
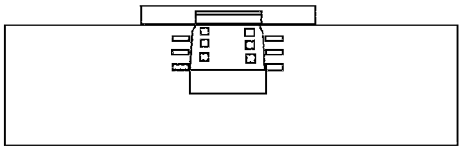
FIG. 14 shows a top view of an exemplary acoustic guitar.
Figure 15:
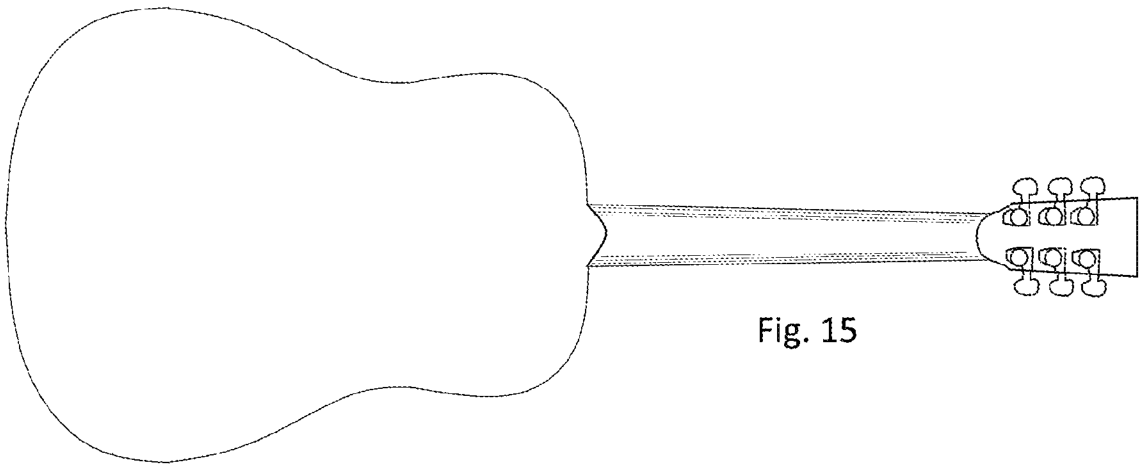
FIG. 15 shows a back view of an exemplary acoustic guitar.
Figure 16:
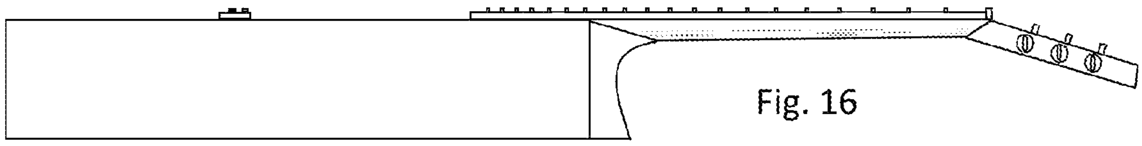
FIG. 16 shows a first side view of an exemplary acoustic guitar.
Figure 17:
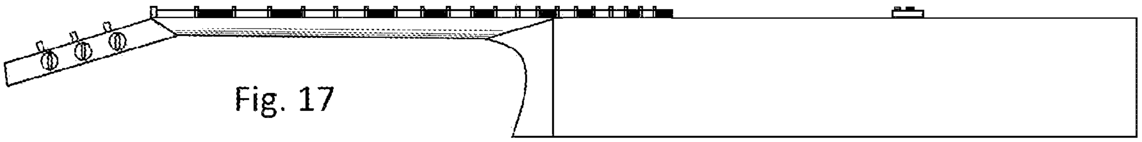
FIG. 17-28 shows a second side views of exemplary fretboard indicators for an acoustic guitar with each string tuned to the same note.
Figure 18:
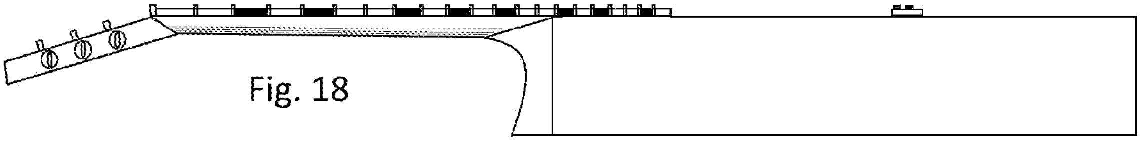
Figure 19:
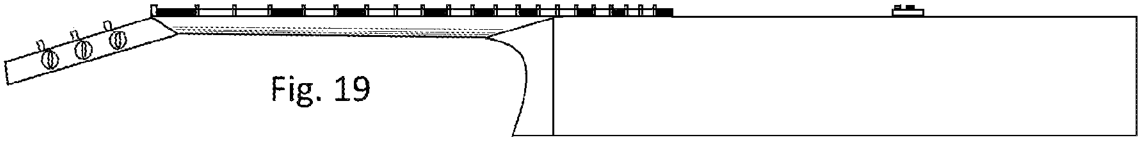
Figure 20:
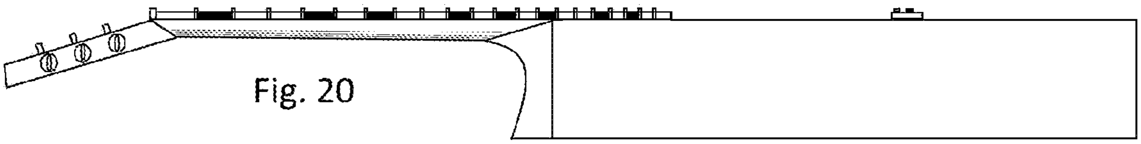
Figure 21:
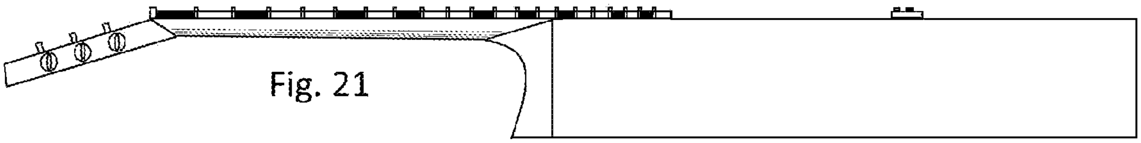
Figure 22:
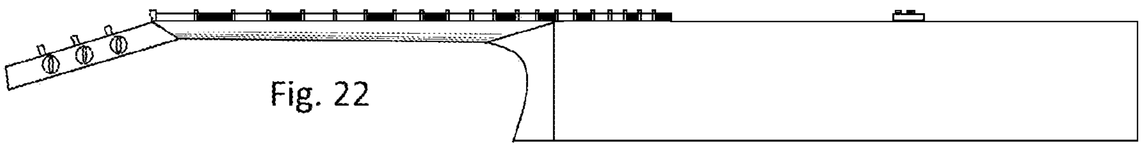
Figure 23:
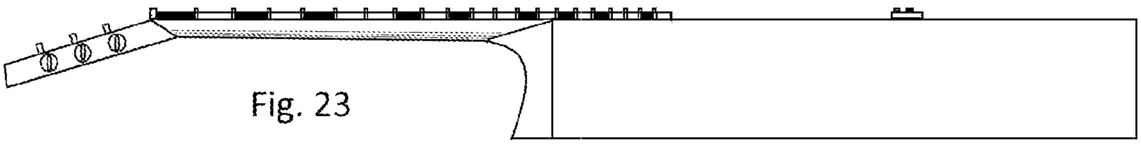
Figure 24:
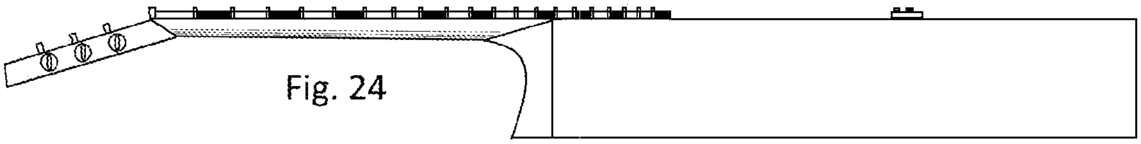
Figure 25:
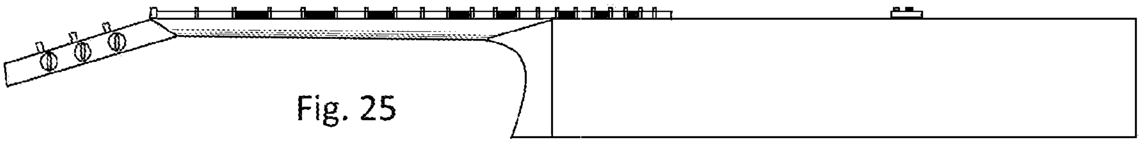
Figure 26:
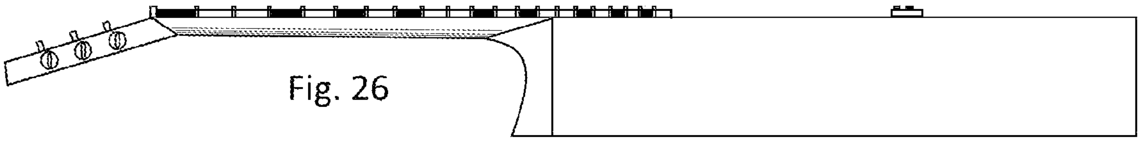
Figure 27:
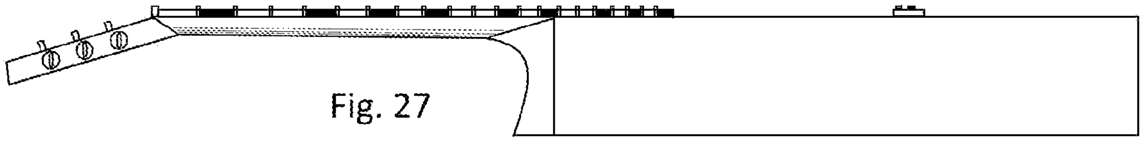
Figure 28:
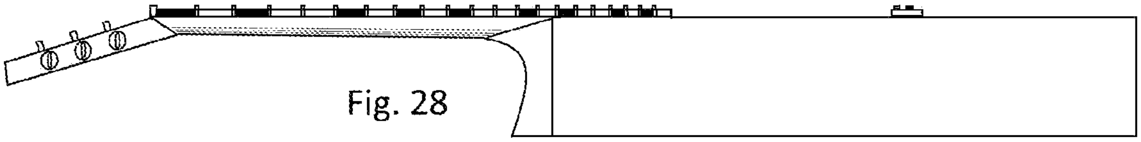
Figure 29:
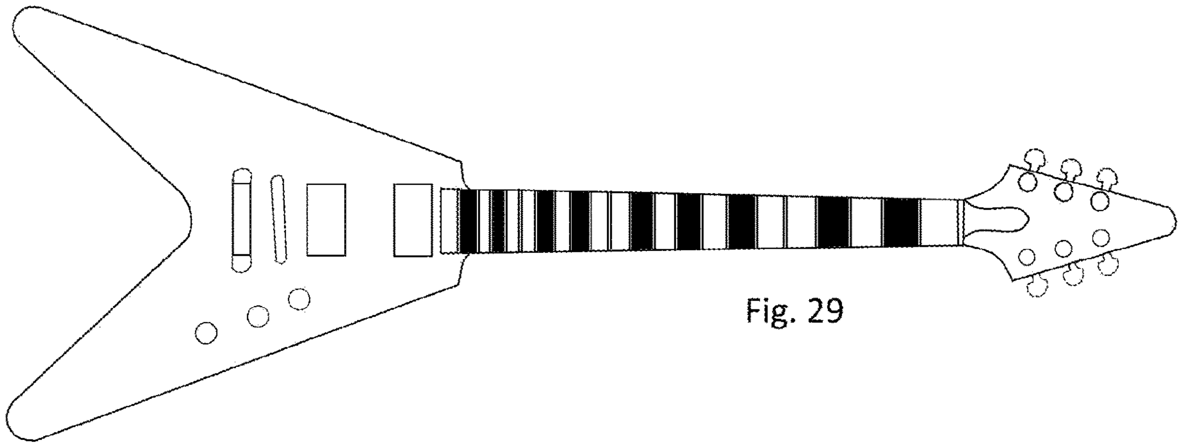
FIGS. 29-40 shows exemplary fretboard indicators for an electric guitar with each string tuned to the same note.
Figure 30:
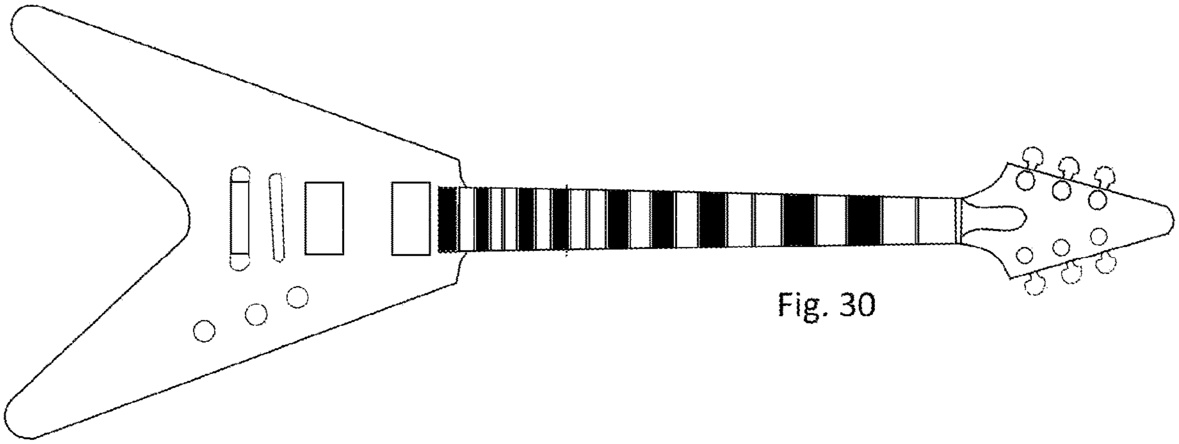
Figure 31:
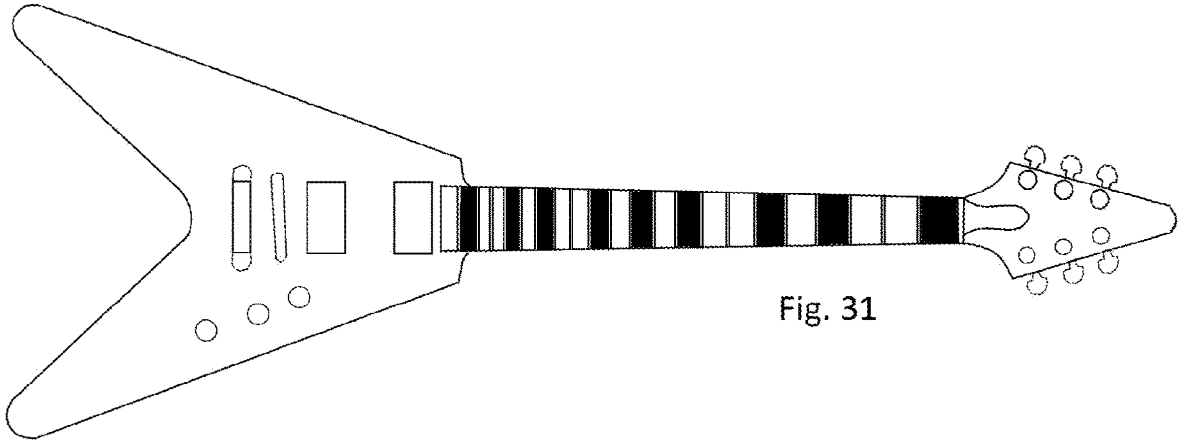
Figure 32:
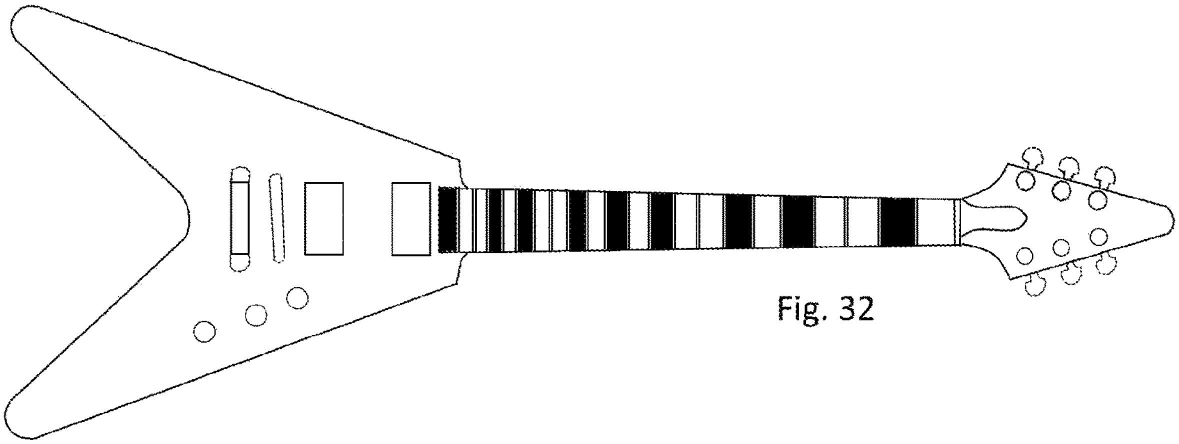
Figure 33:
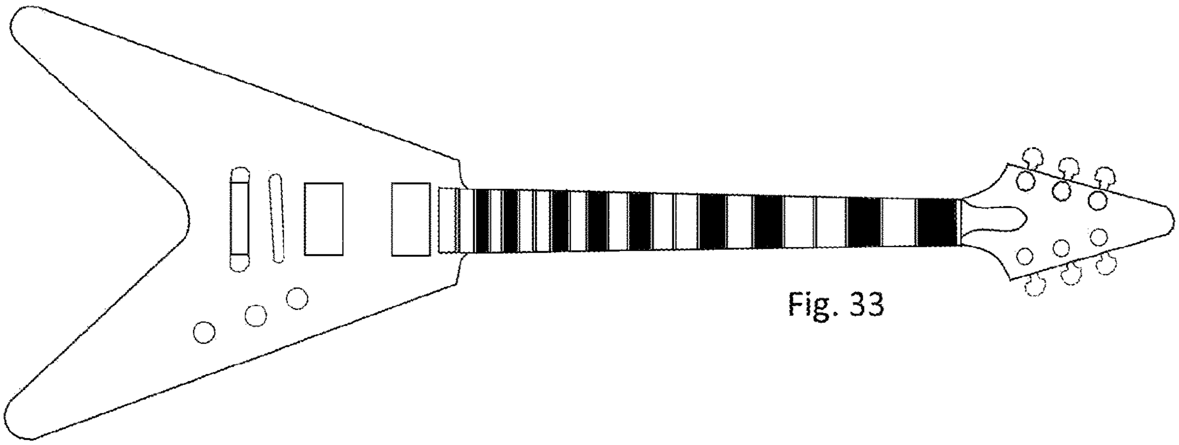
Figure 34:
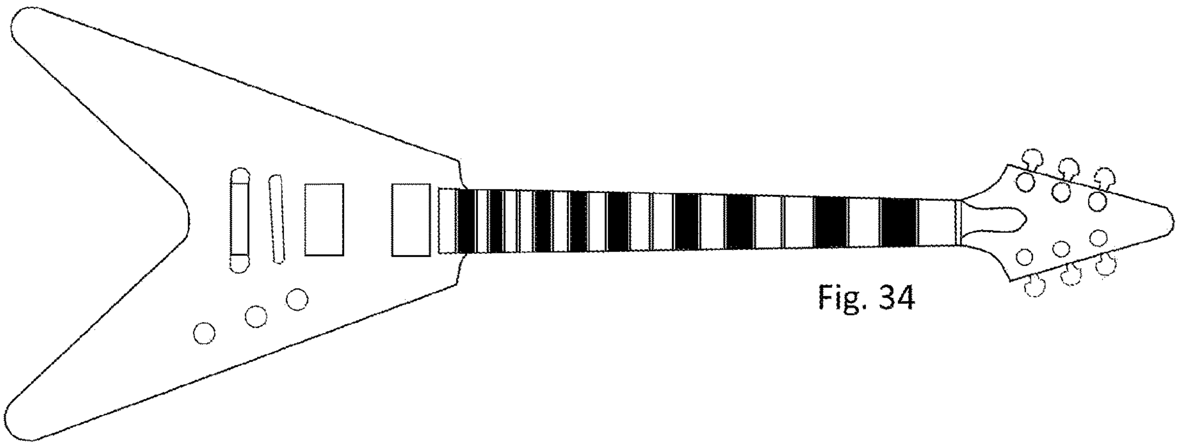
Figure 35:
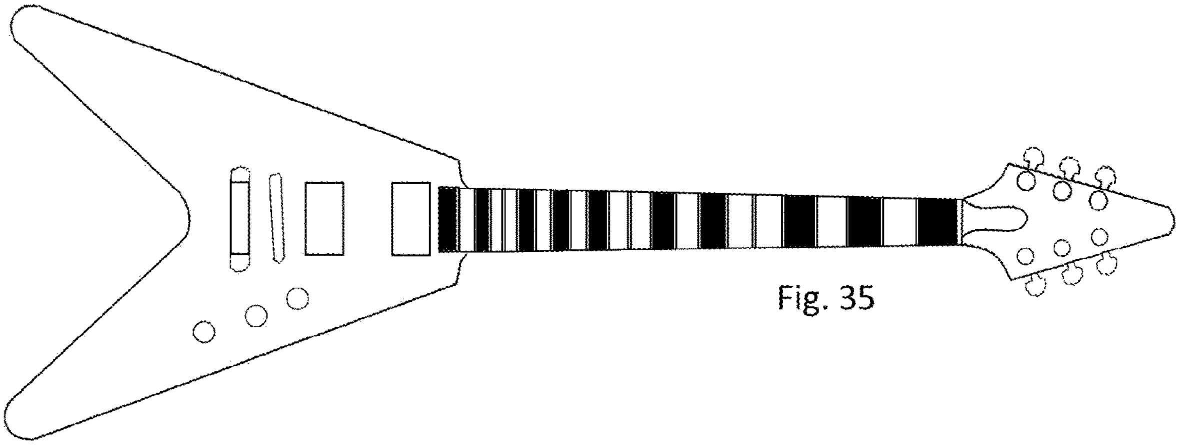
Figure 36:
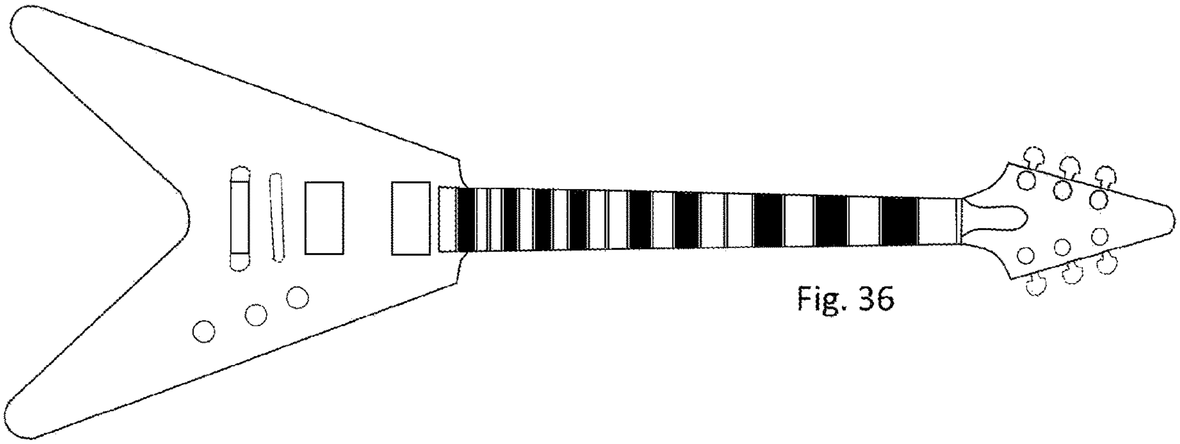
Figure 37:
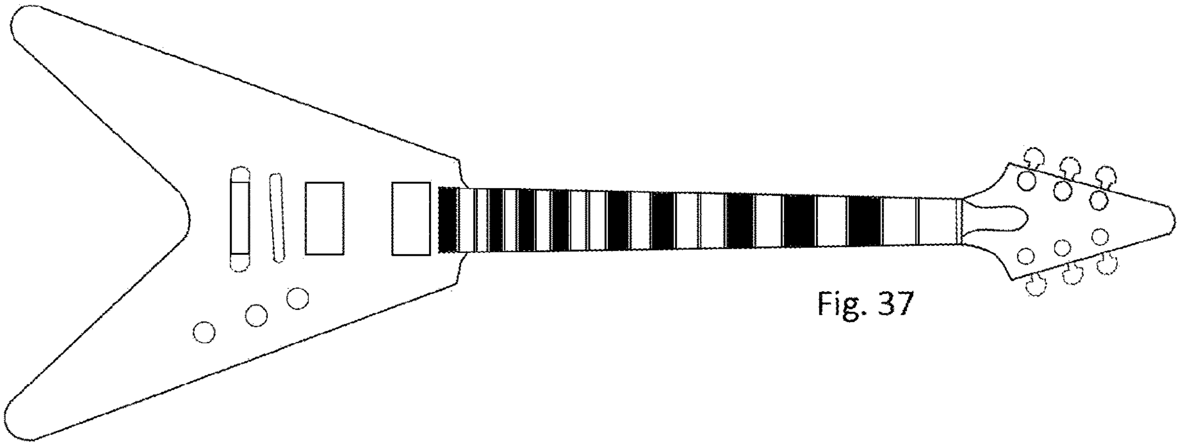
Figure 38:
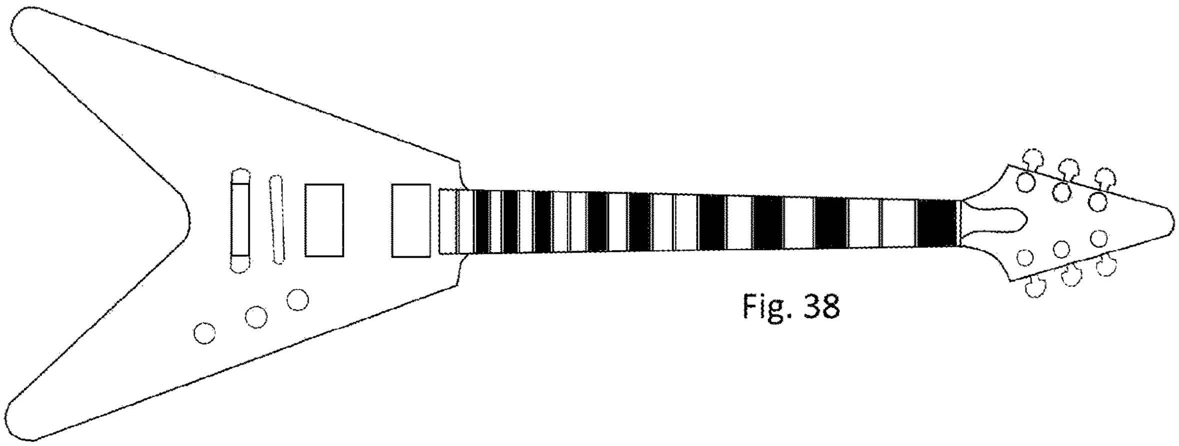
Figure 39:
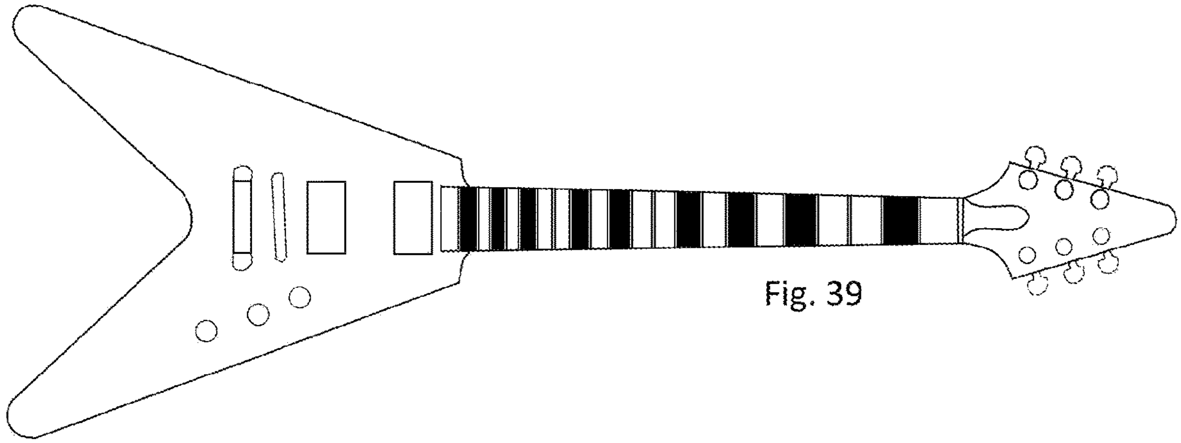
Figure 40:
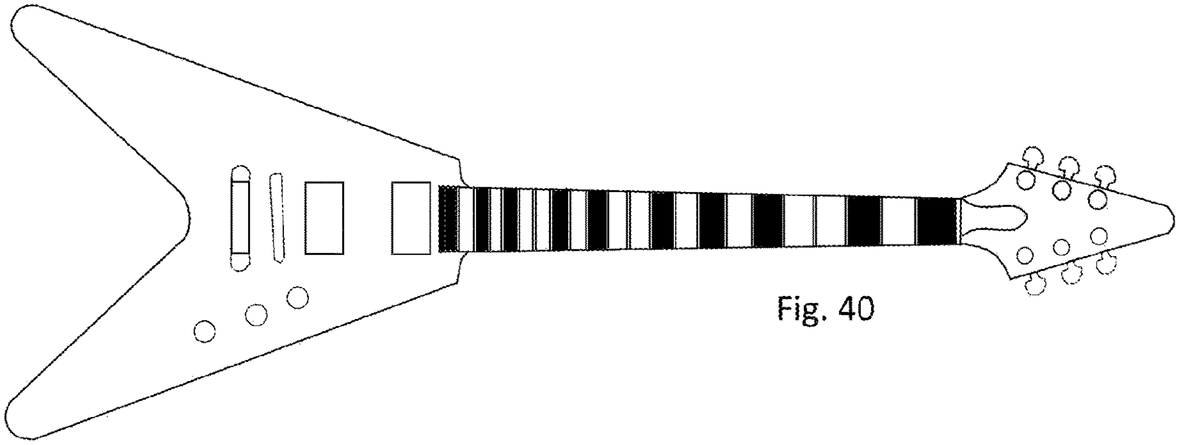
Figure 41:
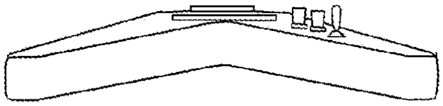
FIG. 41 shows a bottom view of an exemplary electric guitar.
Figure 42:
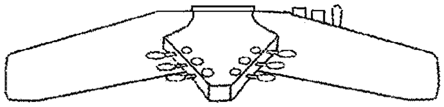
FIG. 42 shows a top view of an exemplary electric guitar.
Figure 43:
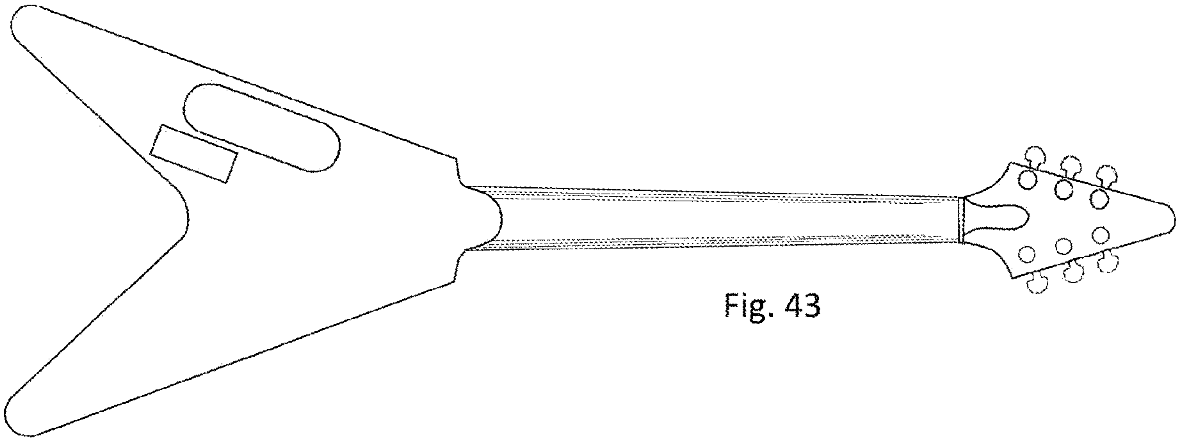
FIG. 43 shows a back view of an exemplary electric guitar.
Figure 44:
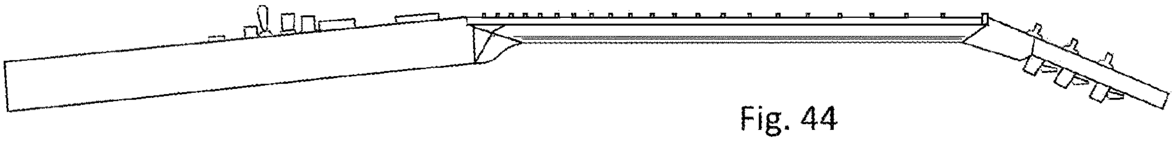
FIG. 44 shows a first side view of an exemplary electric guitar.
Figure 45:
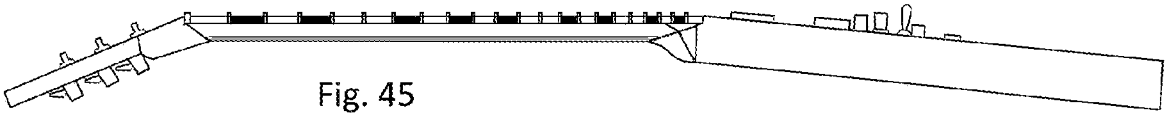
FIGS. 45-56 show a second side of an exemplary electric guitar.
Figure 46:
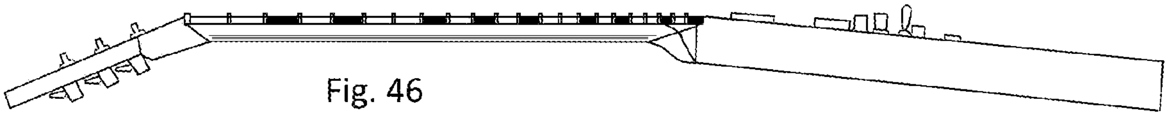
Figure 47:
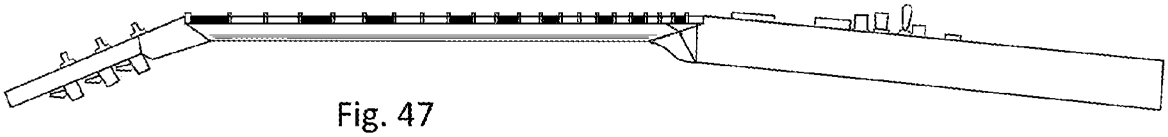
Figure 48:
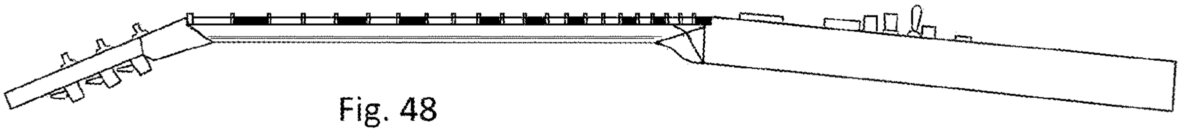
Figure 49:
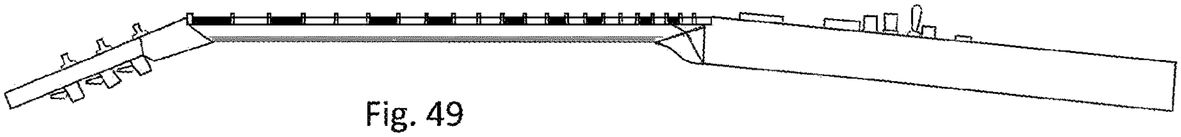
Figure 50:
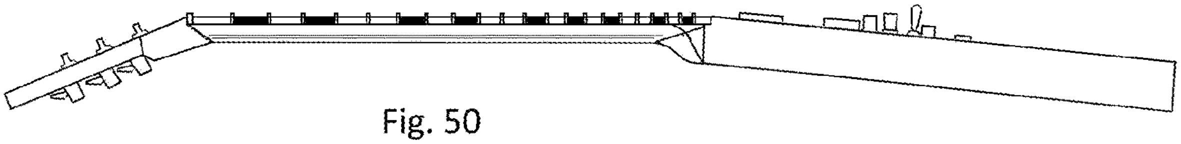
Figure 51:
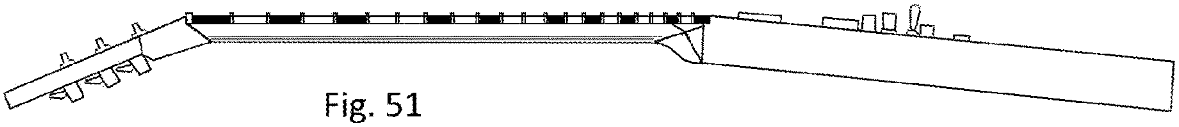
Figure 52:
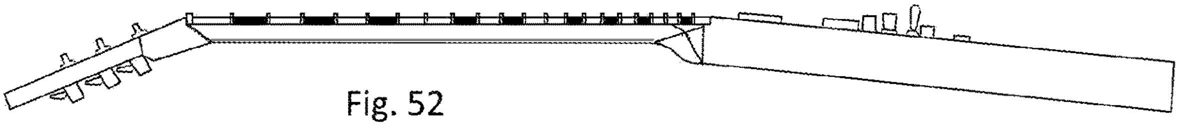
Figure 53:
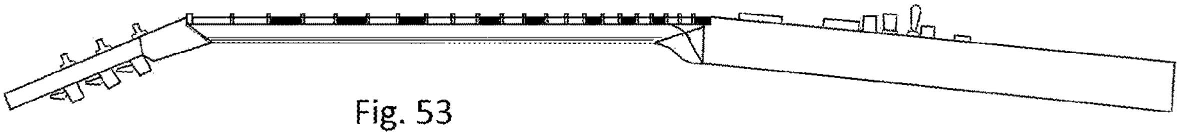
Figure 54:
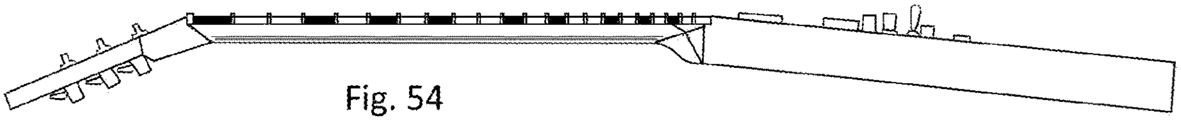
Figure 55:
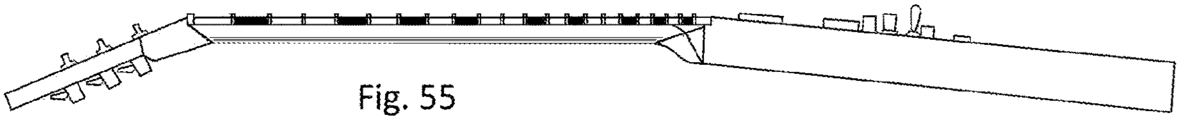
Figure 56:
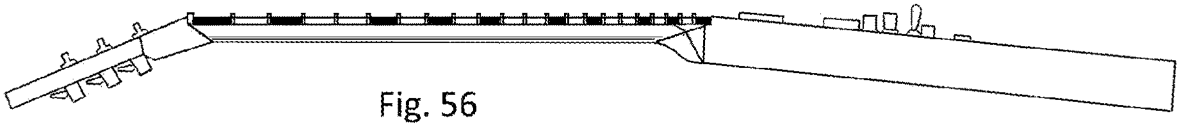

As shown in FIGS. 1-2, the musical instrument may comprise a body 10, a neck 12, a headstock 14, a nut 16, and a bridge 18, with the neck connecting the body and the headstock, the nut disposed on either or in between the headstock and neck, and bridge nut disposed on the body. Strings may span at least from the nut to the bridge, and may be tuned by the pegs 19. The neck may feature a fretboard which itself includes a plurality of frets and a plurality of fret wires, with the fret wires separating fret from subsequent fret. The frets may include the so-called first fret 20, second fret 22, third fret 24, and so-in. Frets may be of a first type 28 which correspond to sharp/flat notes and a second type 26 which correspond to natural notes.

Figure 57:
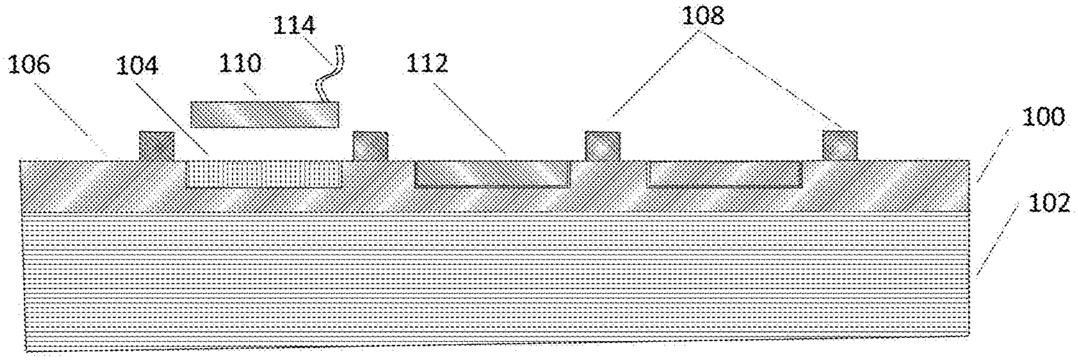
FIG. 57-58 shows a side view of a portion of a neck with recesses configured to receive fret-type indicator inserts.

As shown in FIG. 57, the fretboard 102, disposed on the neck 100, may have a series of recesses 104 disposed in the fret spaces 106 between the fret wires 108. Fret-type indicators 110, which may indicate whether a fret is of the first (i.e., sharp/flat notes) or second fret type (i.e., natural notes) may be inserted into the recesses. The fret-type indicators may fit snugly into the recesses such that an inserted fret-type indicator 112 is flush with the upper surface of the fretboard. While the length of each fret space may differ, the recesses may all have the same dimensions so that one may be interchanged with another, depending on the note to which the string is tuned to. The fret-type indicators may feature a pullable or otherwise graspable tab 114 to assist in their removal from the recesses. The tab may be a string or some other feature that does not interfere with play.

Figure 58:
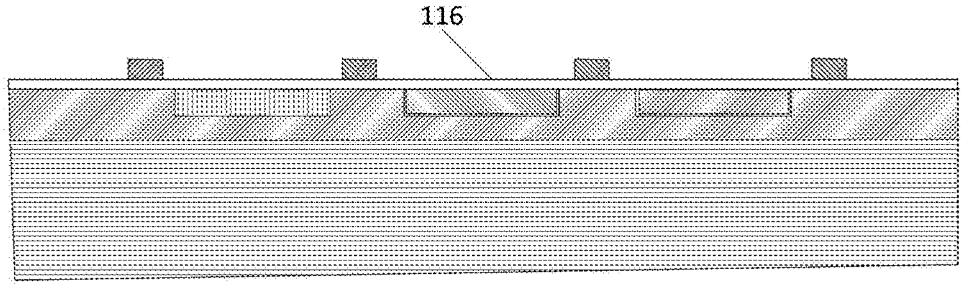
Figure 59:
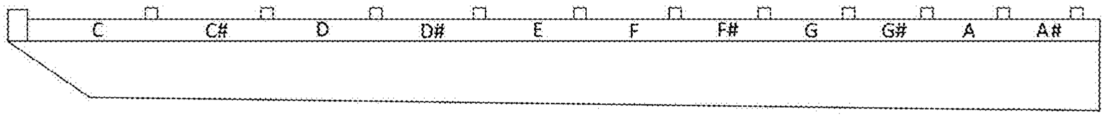
FIG. 59 shows a side view of a portion of a neck with the neck labeled for all strings are tuned to the note "C." The names of the notes are shown in one orientation but in actuality they may be aligned in any direction for best viewing by the player or the audience.
Figure 60:
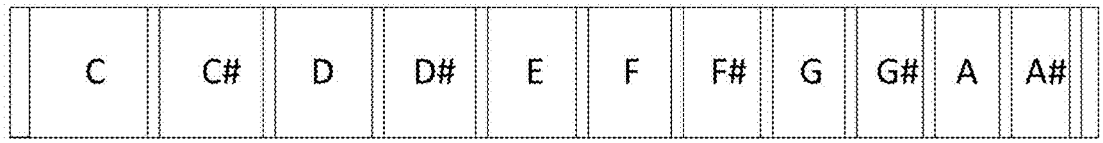
FIG. 60 shows a front view of a portion of the neck with labels indicating the notes for the strings tuned to the note "C." The names of the notes are shown in one orientation but in actuality they may be aligned in any direction for best viewing by the player or the audience.

In one variation, as shown in FIG. 58, a transparent layer 116 comprises on upper surface of the fretboard over the recesses, thus enabling the fret-type indicators to be visible through the transparent layer while maintaining a smoothness of the upper surface of the fretboard. In this variation, the recesses may be accessible by removing the transparent layer, or via a side opening on the neck.

The invention claimed is:

1. A musical instrument comprising a body, neck, a fretboard, and a set of strings,
   a. with the fretboard substantially disposed on the neck, with the neck attached to the body;
   b. with the fretboard comprising a set of frets of a first fret type and a second fret type, with the set of frets arranged in a series;
   c. with the series having a sequential pattern as follows: second fret type, first fret type, second fret type, first fret type, second fret type, first fret type, second fret type, second fret type, first fret type, second fret type, first fret type, second fret type;
   d. with the first fret type being distinguished visually from the second fret type;
   e. with the set of strings tuned to a given note, with the given note for each string being in one or more octaves.

2. The musical instrument of claim 1, additionally comprising a headstock, a nut, and a bridge;
   a. with the nut disposed on the headstock or the neck, or between the headstock and the neck;
   b. with the bridge disposed on the body;
   c. with the headstock attached to the neck;
   d. with the set of strings spanning at least from the nut to the bridge.

3. The musical instrument of claim 2, with the set of strings having approximately the same tension and the same diameter but differing in length between the nut and the bridge.

4. The musical instrument of claim 2, with the strings having approximately the same tension and the same length between the bridge and the nut but differing in diameter.

5. The musical instrument of claim 1, with the first fret type corresponding to sharp or flat notes, and the second fret type corresponding to natural notes.

6. The musical instrument of claim 1, with the fretboard having a front face and a set of recesses disposed behind the front face, with the recesses configured to receive fret type indicators, with the fret type indicators configured to identify the fret type.

7. The musical instrument of claim 6, with the front face being at least partially transparent.

8. The musical instrument of claim 6, with the fret type indicators comprising a first set of magnets or magnetic metals and the recesses comprising a second set of magnets or magnetic metals, with the first set of magnets or magnetic metals configured to engage with the second set of magnets or magnetic metals to impede an accidental removal of the fret type indicators from the recesses.

9. The musical instrument of claim 6, with the fret type indicators comprising tabs to facilitate removal of the fret type indicators from the recesses.

10. The musical instrument of claim 1, with the fretboard having a front and a side and the first fret type and second fret type being identified by indicators, with the indicators being labels configured to be attached to the front or side of the fretboard.

11. The musical instrument of claim 10, with the labels being removable attached to the fretboard.

12. The musical instrument of claim 10, with the labels being permanently attached to the fretboard.

13. The musical instrument of claim 1, additionally comprising a processor and the fretboard comprising a digital display, with the digital display configured for displaying fret types.

14. The musical instrument of claim 13, with the processor programmed to receive from a user a selection of an order of the fret types to be displayed on the digital display.

15. A musical instrument comprising a body, neck, a fretboard, and a set of strings, a. with the fretboard substantially disposed on the neck, with the neck attached to the body;

b. with the fretboard comprising a set of frets of a first fret type and a second fret type, with the set of frets arranged in a series;

c. with the first fret type corresponding to sharp or flat notes, and the second fret type corresponding to natural notes;

d. with the first fret type being distinguished visually from the second fret type;

e. with the fretboard comprising a set of recesses, with the recesses configured to receive fret type indicators, with the fret type indicators configured to identify the fret type.

16. The musical instrument of claim 15, with the fretboard additionally comprising a transparent layer, with the set of recesses disposed below the transparent layer so that the fret type indicators, when inserted into the set of recesses, are visible through the transparent layer.

17. The musical instrument of claim 15, additionally comprising, a nut and a bridge;

a. with the nut disposed at an end of the neck;

b. with the bridge disposed on the body;

c. with the set of strings spanning at least from the nut to the bridge.

18. The musical instrument of claim 17, with the set of strings having:

a. approximately the same tension and the same diameter but differing in length between the nut and the bridge, or b. approximately the same tension and the same length between the bridge and the nut but differing in diameter.

19. The musical instrument of claim 15, with the series having a sequential pattern as follows: second fret type, first fret type, second fret type, first fret type, second fret type, first fret type, second fret type, second fret type, first fret type, second fret type, first fret type, second fret type.

20. A musical instrument comprising a body, neck, and a fretboard, a. with the fretboard substantially disposed on the neck, with the neck attached to the body;

b. with the fretboard comprising a set of frets of a first fret type and a second fret type, with the set of frets arranged in a series;

c. with the first fret type being distinguished visually from the second fret type;

d. with the first fret type corresponding to sharp or flat notes, and the second fret type corresponding to natural notes;

e. with the fretboard comprising a set of recesses, with the recesses configured to receive fret type indicators, with the fret type indicators configured to identify the fret type.

* * * * *